US009312043B2

(12) United States Patent (10) Patent No.: US 9,312,043 B2
Haeger et al. (45) Date of Patent: Apr. 12, 2016

(54) POLYAMIDE COMPOSITION CONTAINING ELECTRICALLY CONDUCTIVE CARBON

(71) Applicants: Harald Haeger, Luedinghausen (DE); Roland Wursche, Duelmen (DE); Sylvia Anita Hermasch, Marl (DE); Lothar Jakisch, Zwickau (DE); Beate Krause, Melssen (DE); Petra Poetschke, Dresden (DE); Robert Socher, Mannheim (DE)

(72) Inventors: Harald Haeger, Luedinghausen (DE); Roland Wursche, Duelmen (DE); Sylvia Anita Hermasch, Marl (DE); Lothar Jakisch, Zwickau (DE); Beate Krause, Melssen (DE); Petra Poetschke, Dresden (DE); Robert Socher, Mannheim (DE)

(73) Assignee: Evonik Degussa GmbH, Essen (DE)

( * ) Notice: Subject to any disclaimer, the term of this patent is extended or adjusted under 35 U.S.C. 154(b) by 164 days.

(21) Appl. No.: 13/804,328

(22) Filed: Mar. 14, 2013

(65) Prior Publication Data

US 2013/0240799 A1 Sep. 19, 2013

(30) Foreign Application Priority Data

Mar. 16, 2012 (DE) .......................... 10 2012 204 181

(51) Int. Cl.
| | | |
|---|---|---|
| *H01B 1/18* | (2006.01) | |
| *H01B 1/04* | (2006.01) | |
| *C08K 3/04* | (2006.01) | |
| *C08K 7/24* | (2006.01) | |
| *H01B 1/24* | (2006.01) | |
| *C08J 3/22* | (2006.01) | |
| *C08K 5/357* | (2006.01) | |
| *C08K 9/04* | (2006.01) | |
| *C08L 77/02* | (2006.01) | |
| *C08L 77/06* | (2006.01) | |

(52) U.S. Cl.
CPC . *H01B 1/04* (2013.01); *C08J 3/226* (2013.01); *C08K 3/04* (2013.01); *C08K 5/357* (2013.01); *C08K 7/24* (2013.01); *C08K 9/04* (2013.01); *C08L 77/02* (2013.01); *C08L 77/06* (2013.01); *H01B 1/24* (2013.01); *C08J 2377/00* (2013.01); *C08J 2477/00* (2013.01); *C08K 2201/011* (2013.01)

(58) Field of Classification Search
None
See application file for complete search history.

(56) References Cited

U.S. PATENT DOCUMENTS

| | | |
|---|---|---|
| 4,663,230 A | 5/1987 | Tennent |
| 5,098,771 A | 3/1992 | Friend |
| 5,424,054 A | 6/1995 | Bethune et al. |
| 5,578,543 A | 11/1996 | Tennent et al. |
| 5,591,382 A | 1/1997 | Nahass et al. |
| 5,611,964 A | 3/1997 | Friend et al. |
| 5,643,502 A | 7/1997 | Nahass et al. |
| 5,651,922 A | 7/1997 | Nahass et al. |
| 6,090,459 A | 7/2000 | Jadamus et al. |
| 6,235,674 B1 | 5/2001 | Tennent et al. |
| 6,316,537 B1 | 11/2001 | Baumann et al. |
| 6,428,866 B1 | 8/2002 | Jadamus et al. |
| 6,608,133 B2 | 8/2003 | Kurasawa et al. |
| 6,656,997 B2 | 12/2003 | Baumann et al. |
| 6,861,540 B2 | 3/2005 | Herwig et al. |
| 7,005,481 B1 | 2/2006 | Lehmann et al. |
| 7,608,738 B2 | 10/2009 | Herwig et al. |
| 8,022,201 B2 | 9/2011 | Roos et al. |
| 8,168,841 B2 | 5/2012 | Herwig et al. |
| 8,232,333 B2 | 7/2012 | Haeger et al. |
| 8,378,127 B2 | 2/2013 | Dingerdissen et al. |
| 8,445,720 B2 | 5/2013 | Hannen et al. |
| 8,871,862 B2 | 10/2014 | Pawlik et al. |
| 8,992,799 B2 * | 3/2015 | Niu et al. ...................... 252/500 |
| 9,000,223 B2 | 4/2015 | Micoine et al. |
| 2003/0089893 A1 * | 5/2003 | Niu et al. ....................... 252/500 |
| 2009/0166592 A1 * | 7/2009 | Manabe et al. ................ 252/511 |
| 2010/0078194 A1 * | 4/2010 | Bhatt et al. .............. 174/110 SR |

(Continued)

FOREIGN PATENT DOCUMENTS

| | | |
|---|---|---|
| DE | 198 12 409 C1 | 4/1999 |
| DE | 10034154 A1 | 1/2002 |

(Continued)

OTHER PUBLICATIONS

Search Report issued Aug. 20, 2013 in European Application No. 13158565.5 (With English Translation of Category of Cited Documents).

(Continued)

*Primary Examiner* — Mark Kopec
*Assistant Examiner* — Jaison Thomas
(74) *Attorney, Agent, or Firm* — Oblon, McClelland, Maier & Neustadt, L.L.P.

(57) ABSTRACT

A polyamide composition which provides moldings having a significantly reduced percolation threshold and an improved electrical conductivity is provided. The composition contains a) at least 40 parts by weight of a polyamide; b) from 0.15 to 25 parts by weight of an electrically conductive carbon; c) from 0.3 to 8 parts by weight of an oligofunctional compound; and, optionally, d) conventional auxiliaries and additives, wherein the electrically conductive carbon comprises at least one of carbon nanotubes and graphene, the oligofunctional compound comprises at least one functional group reactive with reactive groups on a surface of the electrically conductive carbon and at least one functional group reactive with an end group of the polyamide, and the sum of the parts by weight of the components a) to d) is 100.

18 Claims, No Drawings

(56) References Cited

U.S. PATENT DOCUMENTS

| | | |
|---|---|---|
| 2011/0031443 A1* | 2/2011 | Park et al. ............. 252/500 |
| 2011/0171702 A1 | 7/2011 | Reinecke et al. |
| 2011/0251399 A1 | 10/2011 | Dingerdissen et al. |
| 2012/0034665 A1 | 2/2012 | Haas et al. |
| 2012/0241686 A1* | 9/2012 | Bastiaens et al. ....... 252/511 |
| 2012/0264877 A1 | 10/2012 | Häger et al. |
| 2013/0092232 A1 | 4/2013 | Pawlik et al. |
| 2013/0092233 A1 | 4/2013 | Pawlik et al. |
| 2013/0165685 A1 | 6/2013 | Hannen et al. |
| 2013/0171388 A1 | 7/2013 | Pawlik et al. |
| 2013/0207050 A1 | 8/2013 | Hermasch et al. |
| 2013/0299750 A1 | 11/2013 | Hermasch et al. |
| 2014/0141478 A1 | 5/2014 | Schaffer et al. |
| 2014/0178948 A1 | 6/2014 | Schaffer et al. |
| 2014/0186905 A1 | 7/2014 | Schaffer et al. |
| 2014/0242646 A1 | 8/2014 | Pötter et al. |
| 2014/0275323 A1* | 9/2014 | Thibodeau et al. ...... 522/177 |
| 2014/0308717 A1 | 10/2014 | Haas et al. |
| 2015/0111253 A1 | 4/2015 | Schaffer et al. |
| 2015/0111254 A1 | 4/2015 | Hennemann et al. |

FOREIGN PATENT DOCUMENTS

| | | |
|---|---|---|
| EP | 1 301 509 B1 | 10/2004 |
| WO | WO0066650 A2 | 11/2000 |
| WO | WO 02/04441 A1 | 1/2002 |
| WO | WO 2010/128013 A1 | 11/2010 |

OTHER PUBLICATIONS

U.S. Appl. No. 14/649,414, filed Jun. 3, 2015, Schaffer et al.

* cited by examiner

US 9,312,043 B2

POLYAMIDE COMPOSITION CONTAINING ELECTRICALLY CONDUCTIVE CARBON

CROSS REFERENCE TO RELATED APPLICATIONS

This application claims priority to German Application No. 102012204181.8, filed Mar. 16, 2012, the disclosure of which is incorporated by reference in its entirety.

BACKGROUND OF THE INVENTION

The invention relates to a polyamide composition containing carbon nanotubes (CNTs) and/or graphene as electrically conductive carbon substrate and additionally a bifunctional or oligofunctional coupler.

Although there are a few specific exceptions, plastics are generally electrical insulators and when prepared as films or mouldings high surface charges can accumulate during preparation, processing and use.

These static charges may lead to undesirable effects and serious hazard situations which include attraction of dust, adhesion of hygienically problematical contamination, destruction of electronic components through arcing, physiologically unpleasant electric shocks, ignition of flammable liquids in containers or tubes used to stir, pour or convey the liquids, or dust explosions, which may occur, for example during transfer of dusts or fine powders into, between and from large containers or in rock quarrying or coal mining.

Therefore, when plastics are utilized in such manner, elimination or minimization of static charge accumulation is necessary to prevent such hazardous situations.

Conventional thermoplastics have specific surface resistances in the range from $10^{16}$ to $10^{14}$ ohm and can therefore build up voltages of up to 15,000 volts. Effective antistatics reduce the specific surface resistances of the plastics to from $10^{10}$ to $10^9$ ohm. However, a significantly higher degree of removal of electric charges is required for plastics to be used in electronic components of large appliances, e.g. in the transformer or electric substation sector or in many applications in automobile and aircraft construction. where electrically conductive moulding compositions which have to have a specific surface resistance of less than $10^9$ ohm are sought. A further critical aspect is that in such plastics applications not only the surface resistance but also the volume resistance through polymer parts having a thickness of up to a number of millimetres has to be in such a range and in the case of parts which are produced by injection moulding, anisotropic effects frequently occur and are generally difficult to prevent.

In conventional practice, a polymer composition containing carbon black and in particular conductive carbon black is used for the manufacture of conductive polymer parts. Conductive carbon blacks are fractal structures which are able to conduct the electric charge in the polymer by mutual contact and also guarantee a low volume resistance. High degrees of fill in the range from 15 to 25% by weight may be necessary for this purpose and such high content can have an adverse effect on the technical properties of the polymer, especially the mechanical properties such as notched impact toughness or tensile strength. Additionally, such high content may lead to an unsatisfactory surface quality for components which are to be visible, resulting in quality complaints.

Conductive carbon blacks are specific industrial carbon blacks which are produced, inter alia, by the furnace black process or by thermal dissociation in the acetylene black process. These conductive carbon blacks have a high specific surface area as indicated by DBP (dibutyl phthalate) values of more than 110 ml per 100 g of carbon black. Commercially available conductive carbon blacks include, for example, Ketjenblack EC, Printex XE2 and Printex L6.

In comparison, carbon nanotubes (CNTs) and especially graphene may be used in significantly lower concentrations than conductive carbon blacks. However, the dispersion of CNTs and graphene may be extremely process-dependent. For example, the method by which the CNTs are introduced into the extrusion screw at the feed end and the screw configuration selected in an extrusion process may be related to product effectiveness. These are only some of the relevant process parameters which must be considered for effective utilization. Furthermore, the costs of both CNTs and graphene are considerably greater than the price of conductive carbon blacks. Therefore, there is a need for further process and formulation optimization to lower the CNTs or graphene concentration and improve cost efficiency. In some plastics, dispersing these products is particularly difficult since the melt viscosity and the polarity of some thermoplastics are not conducive to dispersion.

Carbon nanotubes are a further modification of the element carbon in addition to graphite, diamond, amorphous carbon and fullerenes. In the nanotube structure the carbon atoms are arranged in hexagons. The structure corresponds to a rolled-up monoatomic or polyatomic layer of graphite so as to form a hollow cylinder typically having a diameter of a few nanometres and a length of up to a few millimetres. Carbon nanotubes may be distinguished as multiwalled and single-walled carbon nanotubes, usually abbreviated as MWNTs and SWNTs. Owing to van der Waals forces, carbon nanotubes have a strong tendency to agglomerate to form bundles, and as a consequence, detangling and dispersing without severe shortening by high shear forces may be essential in the extrusion process. Commercially available products may be obtained from various producers, such as, for example, Bayer, Nanocyl and Arkema and include various grades such as Baytubes® C150P, Baytubes® C150HP, Baytubes® C70P, Nanocyl™ NC7000 and Electrovac Graphistrength C 100. Further manufacturers offer CNTs in the form of masterbatches, for example Hyperion and C-Polymers.

Polyamide compositions containing CNTs are described in U.S. Pat. Nos. 4,663,230; 5,098,771; 5,578,543; 5,591,382; 5,611,964; 5,643,502; 5,651,922; 6,235,674 and 6,608,133.

However, agglomerates of incompletely dispersed fillers frequently occur in the compounding of polymers with conductive fillers, and these limit the product quality of the composition. For example, such agglomerates may lead to surface defects which cannot be tolerated in specific uses. In addition, the conductivity achieved at a given concentration of conductive filler falls far short of the theoretical achievable conductivity.

The assessment of the quality of dispersion may, for example, be conducted by optical microscopic examination of thin sections, with the proportion by area of the agglomerates being measured.

In the light of this background, it was an object of the invention to improve the dispersion of carbon nanotubes or graphene in polyamide moulding compositions. In one aspect of the object, the surface quality of the moulding composition should be improved in this way. In a further aspect of the object, the electrical conductivity should be improved at a given content of carbon nanotubes or graphene or lower filler content should be necessary for achieving a desired conductivity.

SUMMARY OF THE INVENTION

This and other objects have been achieved by the present invention, the first embodiment of which includes polyamide composition, comprising:

a) at least 40 parts by weight of a polyamide;
b) from 0.15 to 25 parts by weight of an electrically conductive carbon;
c) from 0.3 to 8 parts by weight of an oligofunctional compound; and, optionally,
d) conventional auxiliaries and additives,
wherein
the electrically conductive carbon comprises at least one of carbon nanotubes and graphene,
the oligofunctional compound comprises at least one functional group reactive with reactive groups on a surface of the electrically conductive carbon and at least one functional group reactive with an end group of the polyamide, and
the sum of the parts by weight of the components a) to d) is 100.

In one preferred embodiment, the at least one functional group reactive with reactive groups on a surface of the electrically conductive carbon and the at least one functional group reactive with an end group of the polyamide of the oligofunctional compound are selected from the group of reactive functional groups consisting of an oxazinone group, an oxazolone group, an oxazoline group, an isocyanate group, a carbodiimide group, a N-acyllactam group, a N-acylimide group, an aromatic or aliphatic carbonic ester group, an epoxide group and a carboxylic acid anhydride group, with the proviso that compounds which have at least two carbonic ester groups and no further different reactive groups and compounds which contain at least two carbodiimide groups are combined only with amino-functionalized carbon nanotubes, and that compounds which have at least one epoxide group or at least one carboxylic acid anhydride group have a number average molecular weight $M_n$ of not more than 8000 g/mol.

In another preferred embodiment of the present invention the oligofunctional compound c) comprises from 2 to 40 functional groups and in a further preferred embodiment a content of the electrically conductive carbon is from 3 to 25 parts by weight.

DETAILED DESCRIPTION OF THE INVENTION

The present invention provides a polyamide composition, comprising:
a) at least 40 parts by weight of a polyamide;
b) from 0.15 to 25 parts by weight of an electrically conductive carbon;
c) from 0.3 to 8 parts by weight of an oligofunctional compound; and, optionally,
d) conventional auxiliaries and additives,
wherein
the electrically conductive carbon comprises at least one of carbon nanotubes and graphene,
the oligofunctional compound comprises at least one functional group reactive with reactive groups on a surface of the electrically conductive carbon and at least one functional group reactive with an end group of the polyamide, and
the sum of the parts by weight of the components a) to d) is 100.

In one preferred embodiment, the at least one functional group reactive with reactive groups on a surface of the electrically conductive carbon and the at least one functional group reactive with an end group of the polyamide of the oligofunctional compound are selected from the group of reactive functional groups consisting of an oxazinone group, an oxazolone group, an oxazoline group, an isocyanate group, a carbodiimide group, a N-acyllactam group, a N-acylimide group, an aromatic or aliphatic carbonic ester group, an epoxide group and a carboxylic acid anhydride group, with the proviso that compounds which have at least two carbonic ester groups and no further different reactive groups and compounds which contain at least two carbodiimide groups are combined only with amino-functionalized carbon nanotubes, and that compounds which have at least one epoxide group or at least one carboxylic acid anhydride group have a number average molecular weight $M_n$ of not more than 8000 g/mol. Oligofunctional compounds containing multiple different groups selected from the above list are included in the present invention.

According to the present invention particular bifunctional or oligofunctional couplers bind both to the polyamide matrix and to the surface of CNTs or graphene and improve their dispersion in the polyamide.

The polyamide content of the composition may preferably be at least 50 parts by weight and particularly preferably at least 60 parts by weight, of the composition.

The content of the electrically conductive carbon b) may preferably be from 0.2 to 8 parts by weight and particularly preferably from 0.3 to 6 parts by weight, and the content of the oligofunctional compound may preferably be from 0.4 to 6 parts by weight and particularly preferably from 0.5 to 5 parts by weight, of the polyamide composition.

The polyamide may be prepared from a combination of diamine and dicarboxylic acid, from a ω-aminocarboxylic acid or the corresponding lactam. In principle, any polyamide may be suitable for the polyamide composition according to the present invention. Examples include, but are not limited to PA6, PA66 or copolyamides having units derived from terephthalic acid and/or isophthalic acid (generally referred to as PPA) and also PA9T and PA10T and blends thereof with other polyamides. In a preferred embodiment, the monomer units of the polyamide may contain an average of at least 8, at least 9 or at least 10, carbon atoms. In the case of monomer units which are derived from mixtures of lactams, this average is the arithmetic mean. In the case of a combination of diamine and dicarboxylic acid, the arithmetic mean of the carbon atoms of diamine and dicarboxylic acid may preferably be at least 8, more preferably at least 9 and most preferably, at least 10. Suitable polyamides may be, for example: PA610 (produced from hexamethylenediamine [6 carbon atoms] and sebacic acid [10 carbon atoms], so that the average of the carbon atoms in the monomer units is 8), PA88 (prepared from octamethylenediamine and 1,8-octanedioic acid), PA8 (prepared from caprylic lactam), PA612, PA810, PA106, PA108, PA9, PA613, PA614, PA618, PA812, PA128, PA1010, PA1013, PA10, PA814, PA148, PA1012, PA11, PA1014, PA1212, PA12 and also the polyamide of 1,12-dodecanedioic acid and 4,4'-diaminodicyclohexylmethane (PA PACM12), in particular from a 4,4'-diaminodicyclohexylmethane having a trans,trans isomer content of from 35 to 65%. The preparation of the polyamides is conventionally known. Copolyamides of the above compounds, and monomers such as caprolactam can optionally also be used. The polyamide may be a polyether amide or a polyether ester amide. Mixtures of various polyamides may be components of the composition according to the invention.

Carbon nanotubes typically have the shape of tubes formed by graphite layers. The graphite layers are arranged in a concentric fashion around the tube cylinder axis. Carbon nanotubes may also be referred to as carbon nanofibrils. A length-to-diameter ratio of the carbon nanotubes may be at least 5, preferably at least 100, particularly preferably at least 1000. The diameter of the nanofibrils may be in the range from 0.003 to 0.5 μm, preferably in the range from 0.005 to 0.08 μm and particularly preferably in the range from 0.006 to 0.05 μm. The length of the carbon nanofibrils may be from 0.5 to 1000 μm, preferably from 0.8 to 100 μm, particularly preferably from 1 to 10 μm. The carbon nanofibrils have a hollow, cylindrical core. This hollow space may have a diameter of from 0.001 to 0.1 μm and preferably a diameter of from 0.008 to 0.015 μm. In a typical embodiment of the carbon nanotubes, the wall of the fibrils around the hollow space consists of, for example, 8 graphite layers. In addition, it may also be possible to obtain types having a wall which consists of two graphite layers. The carbon nanofibrils may be present as agglomerates having a diameter of up to 1000 μm made up of a plurality of nanofibrils. The agglomerates may have the shape of bird nests, of carded yarn or of open network structures. The synthesis of carbon nanotubes may be conducted, for example, in a reactor containing a carbon-containing gas and a metal catalyst, as is described, for example, in U.S. Pat. No. 5,643,502.

In addition to multiwalled carbon nanotubes (MWCNTs), it may also be possible to use single-walled carbon nanotubes (SWCNTs) according to the invention. SWCNTs typically have a diameter in the range of a few nanometres, but reach considerable lengths relative to their cross section, typically in the range of a few microns. The structure of SWCNTs may be derived from monoatomic graphite layers (graphene) which can be regarded as rolled up to form a seamless cylinder. SWCNTs may be excellent electrical conductors, having achievable current densities of $10^9$ A/cm$^2$ and therefore about 1000 times as high as metal wires composed of copper or silver. The production of SWCNTs is described, for example, in U.S. Pat. No. 5,424,054.

In an actual carbon nanotube, there may be a row of carbon atoms having sp$^3$ hybridization and thus four bonding partners. Entire regions of amorphous carbon (crosslinking of the carbon atoms by sp$^2$ and sp$^3$ hybridization without long-range order) in the shell may be present in MWCNTs. A further possible source of defects in the carbon network may be incomplete bonds. These free bonds are highly reactive and may quickly react with possible bonding partners in the surroundings. It is therefore not unusual for significant numbers of oxygen and nitrogen groups to be identified on the surface of carbon nanotubes. A surface which is particularly low in defects may be obtained by healing such defects by heating in the absence of oxygen at temperatures above 2500° C.

Industrially produced CNTs generally contain large amounts of impurities. Apart from catalyst residues, the impurities are mainly amorphous carbon. To reduce the proportion of amorphous carbon, use is made of the fact that deposits of amorphous carbon are less stable to oxidation than the CNTs themselves. The amorphous carbon may be removed in a simple manner by heating in air at about 700° C. However, such treatment may result in some functionalization of the CNT surface, such as, for example with carboxyl groups.

Furthermore, CNTs whose surface has been deliberately functionalized, for example with amino groups, are commercially available. On the other hand, carboxyl groups and hydroxyl groups can be introduced by oxidation, for example by treatment with nitric acid.

Graphene is the term used for a modification of carbon having a two-dimensional structure in which each carbon atom is surrounded by three further carbon atoms so as to form a honeycomb-like pattern. Graphene is closely related structurally to graphite, which may be considered to be a plurality of superposed graphene layers. Graphene can be obtained in relatively large amounts by exfoliation of graphite (splitting in the basal planes). For this purpose, oxygen is intercalated into the graphite lattice and then reacts partially with the carbon and brings about intrinsic repulsion of the layers. After chemical reduction, the graphenes can, in further steps, be suspended in solutions and embedded in polymers. If the reduction is not carried out gradually to quantitative conversion, the graphene still contains oxygen-containing functional groups.

The oligofunctional compound of the component c) preferably contains from 2 to 40, particularly preferably from 2 to 12, in particular from 2 to 6 and very particularly preferably 2 or 3, functional groups. The upper limit is based on the fact that the oligofunctional compound should have a sufficiently low molecular weight to be molecularly miscible with the polyamide matrix. It has been found that when the oligofunctional compound may only be dispersed in the polyamide matrix, its effectiveness is limited or no longer present. For this reason, preference may be given to the oligofunctional compound of the component c) having a number average molecular weight $M_n$ of not more than 8000 g/mol, preferably not more than 5000 g/mol, particularly preferably not more than 3000 g/mol and in particular not more than 2000 g/mol.

Examples of the oligofunctional compound may include:

1. Compounds which contain at least two oxazinone groups, for instance the compound

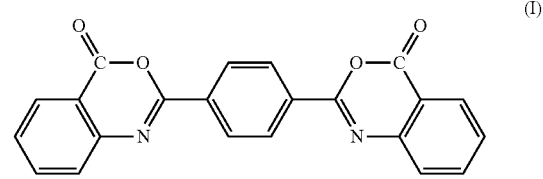 [SMILES: O=c1oc(-c2ccc(-c3nc4ccccc4c(=O)o3)cc2)nc2ccccc12]

(I)

which may be prepared from terephthaloyl chloride and anthranilic acid;

2. Compounds which contain at least two oxazolone groups, for instance the compound

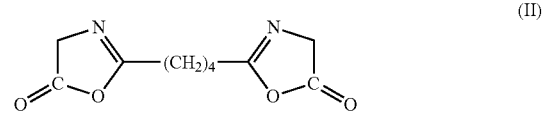

(II)

which can be prepared from adipoyl chloride and glycine;

3) Compounds which contain at least two oxazoline groups, for instance the compound

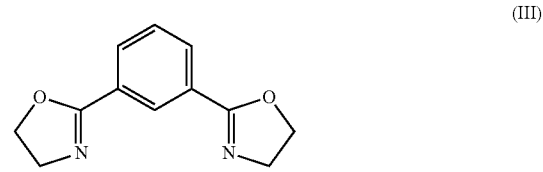 [SMILES: c1cc(C2=NCCO2)cc(C2=NCCO2)c1]

(III)

which may be prepared from isophthalic acid and 2-aminoethanol and is also commercially available;

4) Compounds which contain at least one oxazinone group and at least one oxazoline group, for instance the compound

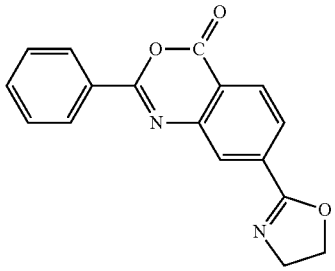 (IV)

Such compounds may be prepared as described in DE 100 34 154 A1;

5) Compounds which contain at least two isocyanate groups, for instance the compound $$O\!=\!C\!=\!N\!-\!C\!-\!(CH_2)_4\!-\!C\!-\!N\!=\!C\!=\!O \quad (V);$$

in which the isocyanate groups may be capped by a CH—, NH— or OH-reactive compound;

6) Compounds which contain at least two carbodiimide groups, for instance $$R^1\!-\!N\!=\!C\!=\!N\!-\!(\!-\!R^2\!-\!N\!=\!C\!=\!N\!-\!)_n\!-\!R^3 \quad (VI)$$

where $R^1$ and $R^3$ are each independently alkyl having from 1 to 20 carbon atoms, cycloalkyl having from 5 to 20 carbon atoms, aryl having from 6 to 20 carbon atoms or aralkyl having from 7 to 20 carbon atoms;

$R^2$ is alkylene having from 2 to 20 carbon atoms, cycloalkylene having from 5 to 20 carbon atoms, arylene having from 6 to 20 carbon atoms or aralkylene having from 7 to 20 carbon atoms;

n is 1 to 39;

7) Compounds which contain at least one carbodiimide group and at least one isocyanate group, for instance $$R^1\!-\!N\!=\!C\!=\!N\!-\!(\!-\!R^2\!-\!N\!=\!C\!=\!N\!-\!)_n\!-\!R^3 \quad (VII)$$

where $R^1$ and $R^3$ are each a radical which bears an isocyanate group which may optionally be capped by a CH—, NH— or OH-reactive compound;

$R^2$ is an alkylene having from 2 to 20 carbon atoms, cycloalkylene having from 5 to 20 carbon atoms, arylene having from 6 to 20 carbon atoms or aralkylene having from 7 to 20 carbon atoms;

n is 0 to 37;

8) Compounds which contain at least two N-acyllactam groups, for instance the compound

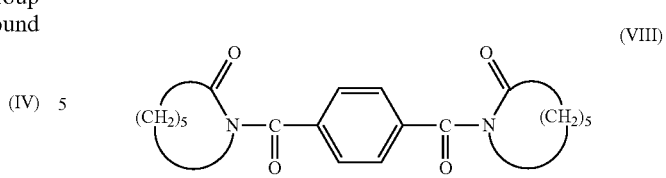 (VIII)

9) Compounds which contain at least two N-acylimide groups, for instance the compound

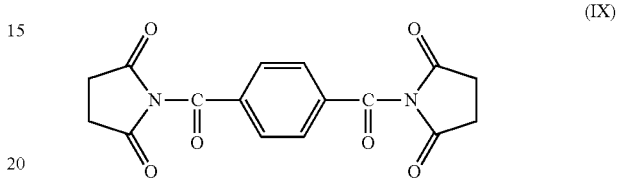 (IX)

10) Compounds which contain at least two aromatic or aliphatic carbonic ester groups; such compounds are disclosed in WO 00/66650, which is hereby fully incorporated by reference. Such compounds may be low molecular weight, oligomeric or polymeric. They may consist entirely of carbonate units or may have further units. There are preferably oligoamide or polyamide, ester, ether, ether ester amide or ether amide units. Such compounds may be prepared by oligomerization or polymerization processes or by polymer-analogous reactions known to persons of skill in the art.

In a preferred embodiment, the oligofunctional compound may be a polycarbonate, for example one based on bisphenol A or a block copolymer containing such a polycarbonate block.

11) Compounds which contain at least one aromatic or aliphatic carbonic ester group and at least one oxazoline group, for instance the reaction product of the carbonic diester of 4-hydroxybenzoic acid and also the compound III which contains, as main component, the following compound:

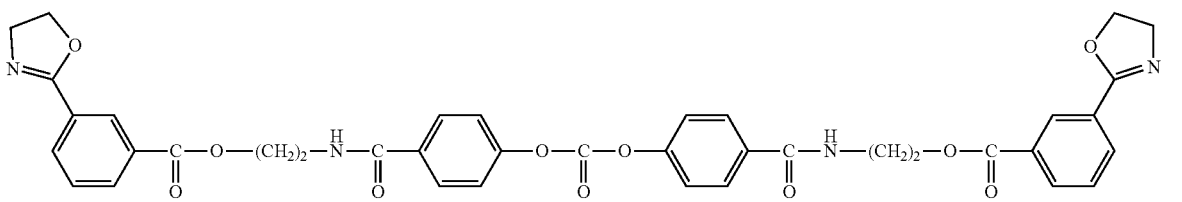 (X)

12) Compounds which contain only one isocyanate group and in addition at least one further group from the various groups previously listed.

13) Compounds which contain at least two epoxide groups, for example the bisglycidyl ether of bisphenol A, triglycidyl isocyanurate or epoxy resins such as Araldite.

14) Compounds which contain at least two carboxylic anhydride groups, for example pyromellitic anhydride, the dianhydride of butane-1,2,3,4-tetracarboxylic acid or low molecular weight styrene-maleic anhydride copolymers.

The reactivities of the various functional groups may be described as follows:

oxazinone groups react first and foremost with hydroxyl or amino groups, oxazolone groups react first and foremost with hydroxyl or amino groups, oxazoline groups react first and foremost with carboxyl groups, isocyanate groups react first and foremost with hydroxyl or amino groups and also with carboxyl groups, carbodiimide groups react first and foremost with hydroxyl or amino groups and also with carboxyl groups, N-acyllactam groups react first and foremost with hydroxyl or amino groups, N-acylimide groups react first and foremost with hydroxyl or amino groups, aromatic or aliphatic carbonic ester groups react first and foremost with amino groups epoxide groups react first and foremost with amino groups and also with hydroxyl or carboxyl groups and carboxylic anhydride groups react first and foremost with amino groups and also with hydroxyl groups.

Taking into account the known reactivities, one of ordinary skill may select the oligofunctional compounds c) according to which functional groups are available firstly on the surface of the CNTs or the graphene and secondly at the ends of the polyamide chains. Polyamide chains are either carboxyl-terminated or amine-terminated. The ratio of carboxyl groups to amino groups may be set by regulation using a monoamine, a monocarboxylic acid or preferably a diamine or a dicarboxylic acid.

In the simplest case, the oligofunctional compound c) may be mixed directly with the polyamide, the CNTs or the graphene and optionally the auxiliaries and additives in the melt. This includes an embodiment in which the CNTs or the graphene are in the form of a masterbatch in the polyamide, but without the oligofunctional compound c). In other cases, prereaction of the oligofunctional compound c) with the electrically conductive carbon in the absence of the polyamide and optionally the other constituents is advantageous. In a preferred embodiment, a masterbatch containing CNTs or graphene having functional groups, a matching oligofunctional compound c) which reacts with these functional groups and a polyamide preferably having complementary, nonreactive end groups may be produced and this is then mixed into a polyamide containing matching, reactive end groups. For example, a masterbatch composed of CNTs bearing carboxyl groups, a compound having two oxazoline groups, for instance the compound III, and a polyamide which contains significantly more amino end groups than carboxyl end groups may be prepared. The oxazoline groups partially react with the carboxyl groups but not with the amino end groups. In the next step, the masterbatch is mixed into a polyamide containing a substantial proportion of carboxyl groups and the bonding to the polyamide takes place upon mixing.

The masterbatch may preferably contain from 3 to 25 parts by weight of the electrically conductive carbon, particularly preferably from 4 to 22 parts by weight and particularly preferably from 5 to 20 parts by weight in each case based on 100 parts by weight of the masterbatch.

In addition to the constituents a) to c), the polyamide composition may also contain, as component d), auxiliaries or additives required for setting particular properties. Examples include impact-modifying rubbers, further polymers such as polyphenylene ethers, ABS or polyolefins, plasticizers, dyes, pigments and fillers such as titanium dioxide, zinc sulphide, silicates or carbonates, flame retardants, processing aids such as waxes, zinc stearate or calcium stearate, mould release agents, glass spheres, glass fibres, antioxidants, UV absorbers, HALSs or antidripping agents. In any such polymeric mixture, the polyamide forms a continuous phase and preferably the matrix.

In one embodiment of the present invention, the polyamide composition contains from 1 to 25% by weight of plasticizers, particularly preferably from 2 to 20% by weight and in particular from 3 to 15% by weight.

A general overview of plasticizers which are suitable for polyamides may be found in Gächter/Müller, Kunststoffadditive, C. Hanser Verlag, 2nd edition, p. 296.

Customary compounds suitable as plasticizers are, for example, esters of p-hydroxybenzoic acid having from 2 to 20 carbon atoms in the alcohol component or amides of arylsulphonic acids having from 2 to 12 carbon atoms in the amine component, preferably amides of benzenesulphonic acid.

Examples of suitable plasticizers may include ethyl p-hydroxybenzoate, octyl p-hydroxybenzoate, i-hexadecyl p-hydroxybenzoate, N-n-octyltoluenesulphonamide, N-n-butylbenzenesulphonamide and N-2-ethylhexylbenzenesulphonamide.

The polyamide composition of the invention may preferably be produced from the individual constituents by melting and mixing in kneading apparatus.

In a preferred embodiment, the polyamide composition has a specific volume resistance in the range from $10^0$ to $10^{11}$ $\Omega$cm and preferably in the range from $10^1$ to $10^9$ $\Omega$cm, with measurements in the range of $10^6$ $\Omega$cm and above being carried out in accordance with DIN IEC 60093 and those in the range below $10^6$ $\Omega$cm being carried out in accordance with EN ISO 3915.

The polyamide composition of the invention may preferably be a polyamide moulding composition. However, it may also be a powder which is employed, for example, for surface coatings or for layer-by-layer buildup processes, for instance in rapid prototyping, which operate, by laser sintering, mask sintering or selective absorbing sintering (SAS).

Mouldings may be produced from the polyamide moulding composition of the invention and processed further by conventionally known methods, including, for example, extrusion, coextrusion, blow moulding or injection moulding. According to the invention, the term "moulding" also encompasses sheet-like bodies such as films or plates. The mouldings obtained with the compositions of the present invention are included as embodiments of the present invention.

It has surprisingly been found that the electrical dissipative effect or the electrical conductivity obtained with the carbon nanotubes or the graphene may be improved further by addition of the oligofunctional compound c). As a result of the improvement in the percolation behaviour, only a smaller total amount of the comparatively very expensive carbon nanotubes or graphene may be required to obtain materials of good static charge dissipation.

As a result of better dispersing and the possible reduction in the concentration of the carbon nanotubes or the graphene, the mouldings produced from the moulding composition have an improved surface quality, which may be determined by observation in a microscope or by measurement of the coefficient of friction or the gloss.

In addition, the impact toughness or notched impact toughness of the mouldings produced from the moulding composition of the invention is in many cases improved compared to a composition which does not contain the oligofunctional compound c). Similarly, improvement in tensile strength in comparison to a composition which does not contain the oligofunctional compound c) may be obtained.

The mouldings made of the moulding composition of the invention may be used where good conductivity properties combined with good mechanical properties are required, for example in the industrial sectors of automobiles, aircraft and electronics and also in communications technology, safety technology and lightweight construction technology. Examples of applications include instrument switches for explosion-protected rooms, antistatic houses, fuel filters, fuel lines and plug connectors.

Having generally described the invention, a further understanding can be obtained by reference to certain specific examples which are provided herein for purposes of illustration only, and are not intended to be limiting unless otherwise specified.

EXAMPLES

In the examples below, the following materials were used:

BS 1189: a low-viscosity PA12 having an excess of carboxyl end groups (115 mmol/kg of carboxyl end groups; 3 mmol/kg of amino end groups); dried overnight at 80° C. in a vacuum drying oven; then stored in a desiccator;

Baytubes C150P: multiwalled carbon nanotubes (MWCNT); dried overnight at 80° C. in a vacuum drying oven; then stored in a desiccator;

Nanocyl NC7000: MWCNT; dried overnight at 80° C. in a vacuum drying oven; then stored in a desiccator;

Nanocyl NC3152: amino-functionalized MWCNT; dried overnight at 80° C. in a vacuum drying oven; then stored in a desiccator;

BFK 1: bifunctional coupler of the formula IV; see preparative example 1;

BFK 2: bifunctional coupler of the formula I; see preparative example 2;

BFK 3: bifunctional coupler of the formula (XI):

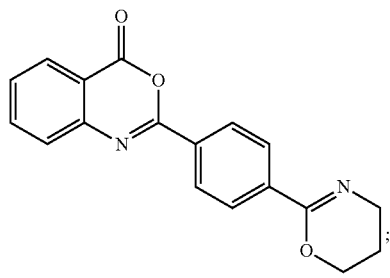

see preparative example 3;

F1 (not according to the invention): monofunctional compound of the formula

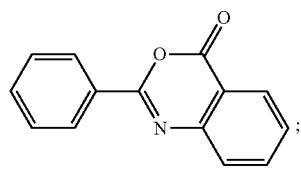 [SMILES: O=c1oc(-c2ccccc2)nc2ccccc12]

see preparative example 4;

BFK 4 (not according to the invention): bifunctional compound of the formula

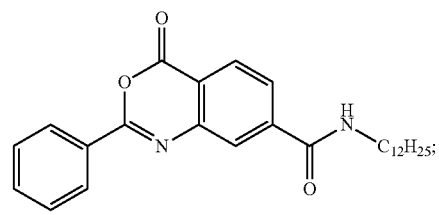

see preparative example 5;

BFK 5 (not according to the invention): bifunctional compound of the formula

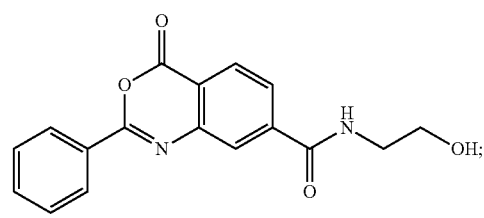 [SMILES: O=C(NCCO)c1ccc2c(=O)oc(-c3ccccc3)nc2c1]

see preparative example 6;

BFK 6 (not according to the invention): bifunctional compound of the formula

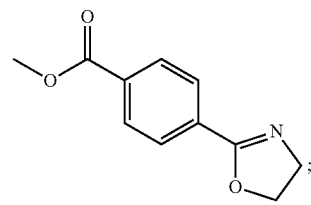

see preparative example 7.

Preparative Example 1

7-(4,5-Dihydrooxazol-2-yl)-2-phenylbenzo[d][1,3]oxazin-4-one (BFK 1) according to L. Jakisch et al., Journal of Polymer Science: Part A: Polymer Chemistry 2003; 41(5): 655-667

36.2 g (200 mmol) of 2-aminoterephthalic acid were added to a solution of 28.2 g (200 mmol) of benzoyl chloride in 500 ml of dried tetrahydrofuran which had been cooled to 0-10° C. 20.2 g of triethylamine (200 mmol) were then added dropwise over a period of 30 minutes. After stirring at room temperature for another 1 hour, the solvent was distilled off under reduced pressure. The solid residue was suspended in 400 ml of water, filtered off and washed with water. After thorough drying, this intermediate was stirred with 300 ml of thionyl chloride at 60° C. until no more bubbles formed. The excess of thionyl chloride was then distilled under reduced pressure. The residue was dissolved in 200 ml of toluene under reflux. After cooling and precipitation with 1000 ml of n-hexane, the intermediate 2-phenyl-4-oxo-4H-benzo[d][1,3]oxazine-7-carbonyl chloride was filtered off, washed with n-hexane and dried.

28.6 g (100 mmol) of the intermediate were dissolved in 150 ml of dried tetrahydrofuran. After cooling to 0-10° C., a mixture of 6.1 g of 2-ethanolamine (100 mmol) and 10.1 g of triethylamine (100 mmol) in 50 ml of tetrahydrofuran was added dropwise over a period of 30 minutes. After stirring at room temperature for another 1 hour, the precipitate was separated off, washed successively with small amounts of tetrahydrofuran and water and dried.

15.5 g (50 mmol) of this intermediate were suspended in a mixture of 30.0 g (250 mmol) of thionyl chloride and 200 ml of dried tetrahydrofuran at from −5 to 0° C. The suspension was stirred at this temperature for 12 hours; the reaction product was then separated off, washed with tetrahydrofuran and dried under reduced pressure. The product was suspended in a solution of 8.4 g of sodium bicarbonate (100 mmol) in 300 ml of water; after stirring at room temperature for 10 minutes, the solid product was separated off and washed with water. After heating in 200 ml of acetone under reflux for 10 minutes, the end product was filtered off.

Preparative Example 2

2,2'-(1,4-Phenylene)bis(4H-3,1-benzoxazin-4-one) (BFK 2) according to Inata et al.; Journal of Applied Polymer Science 1986; 32(4): 4581-4594

The synthesis was carried out in a 500 ml three-neck flask provided with magnetic stirrer, reflux condenser, drying tube and dropping funnel. 2.03 g (10 mmol) of terephthaloyl chloride were dissolved in 50 ml of N,N-dimethylacetamide and 2.74 g (20 mmol) of 2-aminobenzoic acid as powder were added thereto while stirring. A mixture of 2.02 g (20 mmol) of triethylamine and 5 ml of N,N-dimethylacetamide was subsequently slowly added dropwise at room temperature. After stirring at room temperature for 1 hour, 200 ml of water were added and the precipitate formed was filtered off with suction, washed with water and dried at 80° C. under reduced pressure. The product was then heated in 50 ml of acetic anhydride under reflux for 2 hours. After cooling, the precipitate formed was filtered off with suction and washed with acetic acid and then with water. After boiling with acetone, 3.20 g of product were obtained.

Preparative Example 3

2-(4-Oxazolinyl)-4H-3,1-benzoazin-4-one (BFK3)

The compound was prepared by the method described by L. Jakisch et al.; Macromolecular Symposia 2000; 149: 237-243.

Preparative Example 4

2-Phenyl-4H-3,1-benzoxazin-4-one (F1)

In a 500 ml three-necked flask provided with magnetic stirrer, reflux condenser, drying tube and dropping funnel, 2.81 g (20 mmol) of benzoyl chloride were dissolved in 50 ml of N,N-dimethylacetamide and 2.74 g (20 mmol) of 2-aminobenzoic acid as powder were added thereto while stirring. A mixture of 2.02 g (20 mmol) of triethylamine and 5 ml of N,N-dimethylacetamide were subsequently slowly added dropwise at room temperature. After stirring at room temperature for 1 hour, 200 ml of water were added and the precipitate formed was filtered off with suction, washed with water and dried at 80° C. under reduced pressure. The product was then heated in 50 ml of acetic anhydride under reflux for 2 hours. After cooling, the precipitate formed was filtered off with suction and washed with acetic acid and then with water. Recrystallization from n-hexane gave 3.65 g of product.

Preparative Example 5

7-n-Dodecylcarbamoyl-2-phenyl-4H-3,1-benzoxazin-4-one (BFK 4)

The synthesis started out from 2-phenyl-7-chlorocarbonyl-4H-3,1-benzoxazin-4-one, whose synthesis is descried in L. Jakisch et al., Journal of Polymer Science: Part A: Polymer Chemistry 2003; 41(5): 655-667 (there compound 10a). 2.855 g (10 mmol) of this substance was suspended in 100 ml of dry tetrahydrofuran at 0° C. in a 250 ml three-necked flask provided with magnetic stirrer, reflux condenser and drying tube. A mixture of 1.854 g (10 mmol) of n-dodecylamine, 1.012 g (10 mmol) of triethylamine and 20 ml of dry tetrahydrofuran was then slowly added dropwise at from 0 to 5° C. The reaction mixture was subsequently stirred at room temperature for 2 hours, and the resultant precipitate of triethylammonium chloride was then filtered off with suction and the filtrate was evaporated on a rotary evaporator. The solid residue was washed with water and dried at 60° C. under reduced pressure. Recrystallization from ethanol gave 2.85 g of product.

Preparative Example 6

7-(2-Hydroxyethyl)carbamoyl-2-phenyl-4H-3,1-benzoxazin-4-one (BFK 5)

The preparation was carried out in a manner analogous to Preparative Example 5 using 2-ethanolamine instead of n-dodecylamine.

Preparative Example 7

2-(4-Methoxycarbonyl)phenyloxazoline (BFK 6)

The preparation was carried out in a manner analogous to Preparative Example 3 from monomethyl terephthalate chloride and 2-ethanolamine and subsequent ring closure by means of thionyl chloride.

Production of the Polyamide/CNT Compounds and Also Specimen Preparation

Production of the compounds on a very small scale was carried out in a corotating twin-screw compounder from DACA Instruments, Santa Barbara, USA. The two screws were arranged conically relative to one another. The internal volume of the micro compounder was 4.5 cm$^3$ (weight used: 4.2 g). The material was conveyed via a bypass from the lower end of the apparatus back to the top and could circulate in this way. Via a valve at the lower end, the material was taken off as a strand. The mixing speed was 250 rpm, the mixing time was 5 minutes and the mixing temperature was 210° C. The amounts used are indicated in Tables 1 to 5.

The extruded strands were cut into pieces having a length of a few millimetres and subsequently hot-pressed (220° C., 1 min) in a Weber press (model PW 40 EH, Paul Otto Weber GmbH, Remshalden, Germany) to give plates (30 mm diameter, 0.5 mm thickness). The plates were cleaned with ethanol before measurement of the specific volume resistance.

Electrical Resistance Measurement

For specimens having a specific volume resistance of more than 10$^7$ Ω·cm, a Keithley 8009 plate measurement cell with Keithley Elektrometer E6517A was used, while a strip measurement cell with Keithley Elektrometer E6517A was used for specimens having a resistance of less than $10^7$ Ω·cm. The measurement results on the mixtures according to the invention and the comparative mixtures are shown in Tables 1 to 5.

TABLE 1

Example 1; formulations and results

| | Baytubes | | | |
|---|---|---|---|---|
| BS 1189 [g] | C150P [g] | [%] | BFK 1 [g] | Specific volume resistance [Ωcm] |
| 4.180 | 0.021 | 0.5 | 0.043 | $3.39 \cdot 10^{10}$ |
| 4.173 | 0.026 | 0.625 | 0.042 | $1.55 \cdot 10^8$ |
| 4.159 | 0.042 | 1 | 0.042 | $4.57 \cdot 10^4$ |
| 4.114 | 0.084 | 2 | 0.084 | $8.07 \cdot 10^2$ |
| 4.076 | 0.126 | 3 | 0.126 | $6.73 \cdot 10^1$ |
| 3.991 | 0.210 | 5 | 0.210 | $3.38 \cdot 10^1$ |

The electrical percolation threshold of compounds composed of BS 1189 with Baytubes C150P was 2.1% by weight. If the compounds additionally contained, as shown in Table 1, the bifunctional coupler, the percolation threshold was only about 0.6% by weight. Accordingly, the addition of the bifunctional coupler brought about a significant reduction in the percolation threshold even when using (theoretically) unfunctionalized CNTs. Even in the case of values significantly above the electrical percolation threshold, the use of the bifunctional coupler led to lower electrical volume resistance values.

TABLE 2

Example 2; formulations and results

| | Nanocyl | | | |
|---|---|---|---|---|
| BS 1189 [g] | NC7000 [g] | [%] | BFK 1 [g] | Specific volume resistance [Ωcm] |
| 4.193 | 0.005 | 0.125 | 0.042 | $4.81 \cdot 10^{12}$ |
| 4.194 | 0.008 | 0.1875 | 0.042 | $6.49 \cdot 10^6$ |
| 4.190 | 0.0105 | 0.25 | 0.042 | $3.90 \cdot 10^4$ |
| 4.184 | 0.0158 | 0.375 | 0.043 | $3.80 \cdot 10^3$ |
| 4.158 | 0.042 | 1 | 0.042 | $9.12 \cdot 10^1$ |
| 4.118 | 0.084 | 2 | 0.083 | $3.49 \cdot 10^1$ |
| 4.075 | 0.126 | 3 | 0.126 | $2.29 \cdot 10^1$ |
| 3.990 | 0.210 | 5 | 0.210 | $1.15 \cdot 10^1$ |

Compounds composed of BS 1189 and Nanocyl NC7000 percolated at about 0.7% by weight. On addition of at least 1% by weight of bifunctional coupler, the percolation threshold was reduced to about 0.2% by weight. Here too, the use of the bifunctional coupler led to lower electrical volume resistances for values significantly above the electrical percolation threshold.

TABLE 3

Example 3; formulations and results

| | Nanocyl | | | |
|---|---|---|---|---|
| BS 1189 [g] | NC3152 [g] | [%] | BFK 1 [g] | Specific volume resistance [Ωcm] |
| 4.158 | 0.042 | 1 | — | $8.39 \cdot 10^{10}$ |
| 4.149 | 0.053 | 1.25 | — | $7.68 \cdot 10^8$ |
| 4.115 | 0.084 | 2 | — | $2.50 \cdot 10^5$ |
| 4.075 | 0.126 | 3 | — | $1.02 \cdot 10^4$ |
| 4.032 | 0.168 | 4 | — | $1.81 \cdot 10^3$ |
| 4.187 | 0.016 | 0.375 | 0.016 | $7.93 \cdot 10^{13}$ |
| 4.175 | 0.021 | 0.5 | 0.011 | $2.93 \cdot 10^8$ |

TABLE 3-continued

Example 3; formulations and results

| | Nanocyl | | | |
|---|---|---|---|---|
| BS 1189 [g] | NC3152 [g] | [%] | BFK 1 [g] | Specific volume resistance [Ωcm] |
| 4.166 | 0.032 | 0.75 | 0.016 | $7.23 \cdot 10^4$ |
| 4.160 | 0.041 | 1 | 0.021 | $2.37 \cdot 10^3$ |
| 4.147 | 0.052 | 1.25 | 0.026 | $3.32 \cdot 10^2$ |
| 4.115 | 0.084 | 2 | 0.042 | $6.12 \cdot 10^1$ |
| 4.075 | 0.126 | 3 | 0.063 | $2.23 \cdot 10^1$ |

The percolation threshold for compounds composed of BS 1189 and Nanocyl NC3152 was about 1.25% by weight. On the other hand, compounds containing the bifunctional coupler percolated at a CNT content of about 0.5% by weight. Here too, the percolation threshold could be significantly reduced by addition of the bifunctional coupler; in addition, use of the bifunctional coupler here also led to lower electrical volume resistance values for values significantly above the electrical percolation threshold.

TABLE 4

Example 4 and Comparative Examples 1 to 4; effectiveness of various additives in BS 1189-Baytubes C150P compounds (1% by weight of additive and 1% by weight of CNT)

| Example (E) or Comparative Example (CE) | Additive | Specific volume resistance [Ωcm] | Comments |
|---|---|---|---|
| E4 | BFK 3 | $1.08 \cdot 10^4$ | Isomer of BFK 1 |
| CE 1 | BFK 4 | $4.50 \cdot 10^8$ | |
| CE 2 | BFK 5 | $6.63 \cdot 10^9$ | 2-Hydroxyethylamide likewise reacted with carboxyl groups of the PA, but significantly more slowly than oxazoline |
| CE 3 | BFK 6 | $4.34 \cdot 10^{11}$ | |

TABLE 5

Example 5; formulations and results

| | Baytubes | | | |
|---|---|---|---|---|
| BS 1189 [g] | C150P [g] | [%] | BFK 2 [g] | Specific volume resistance [Ωcm] |
| 4.174 | 0.026 | 0.625 | 0.043 | $3.49 \cdot 10^8$ |
| 4.157 | 0.042 | 1 | 0.042 | $6.35 \cdot 10^3$ |
| 4.072 | 0.042 | 1 | 0.127 | $2.64 \cdot 10^3$ |

The use of the bisoxazinone coupler resulted in a significant reduction in the electrical volume resistance. A larger proportion of bisoxazinone led to a slight lowering of the volume resistance. However, only a small degree of bonding to the polymer can be assumed from the very small proportion of amino end groups in BS 1189.

At a higher CNT content, such a compound was suitable as masterbatch; on mixing of such a masterbatch with a polyamide which has a higher proportion of amino end groups, efficient bonding even to the polyamide took place.

Numerous modifications and variations on the present invention are possible in light of the above description. It is therefore understood that within the scope of the appended claims, the invention may be practiced otherwise than as specifically described herein.

The invention claimed is:

1. A polyamide composition, comprising:
   a) at least 40 parts by weight of a polyamide;
   b) from 0.15 to 25 parts by weight of an electrically conductive carbon;
   c) from 0.3 to 8 parts by weight of an oligofunctional compound; and, optionally,
   d) conventional auxiliaries and additives,
   wherein
   the electrically conductive carbon comprises at least one of carbon nanotubes and graphene,
   the oligofunctional compound comprises at least one functional group reactive with reactive groups on a surface of the electrically conductive carbon and at least one functional group reactive with an end group of the polyamide, wherein the at least one functional group reactive with reactive groups on a surface of the electrically conductive carbon and the at least one functional group reactive with an end group of the polyamide of the oligofunctional compound are selected from the group of reactive functional groups consisting of an oxazinone group, an oxazolone group, an oxazoline group, an isocyanate group, a carbodiimide group, a N-acyllactam group, a N-acylimide group, an aromatic or aliphatic carbonic ester group, and an epoxide group,
   with the proviso that
   compounds which have at least two carbonic ester groups and no further different reactive groups and compounds which contain at least two carbodiimide groups are combined only with amino-functionalized carbon nanotubes, and that
   compounds which have at least one epoxide group have a number average molecular weight $M_n$ of not more than 8000 g/mol; and
   the sum of the parts by weight of the components a) to d) is 100.

2. The polyamide composition according to claim 1, wherein the oligofunctional compound c) comprises from 2 to 40 functional groups.

3. The polyamide composition according to claim 1, wherein a content of the electrically conductive carbon is from 3 to 25 parts by weight.

4. The polyamide composition according to claim 1, which comprises covalent linkages wherein the oligofunctional compound bonds to the polyamide and to the carbon nanotubes or graphene.

5. The polyamide composition according to claim 1, wherein the oligofunctional compound is of formula (IV):

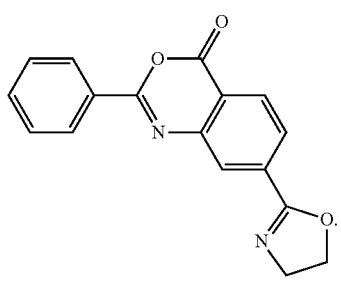

6. The polyamide composition according to claim 1, wherein the oligofunctional compound is of formula (I):

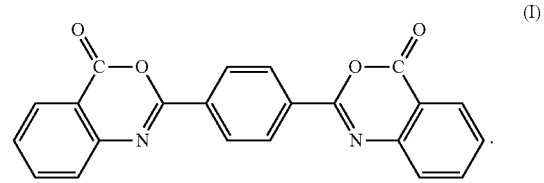 [SMILES: O=c1oc(-c2ccc(-c3nc4ccccc4c(=O)o3)cc2)nc2ccccc12]

7. The polyamide composition according to claim 1, wherein the oligofunctional compound is of formula (XI):

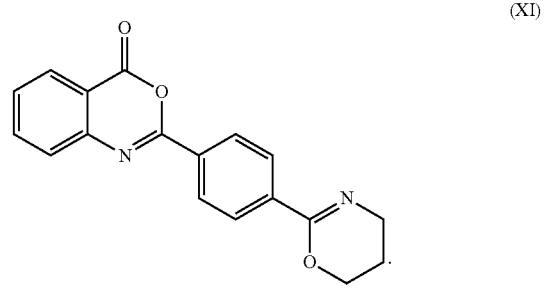 [SMILES: O=c1oc(-c2ccc(C3=NCCCO3)cc2)nc2ccccc12]

8. The polyamide composition according to claim 1, wherein the polyamide comprises monomer units of an average of at least 8 carbon atoms.

9. The polyamide composition according to claim 8, wherein the polyamide comprises at least one selected from the group consisting of PA610, PA88, PA8, PA612, PA810, PA106, PA108, PA9, PA613, PA614, PA618, PA812, PA128, PA1010, PA1013, PA10, PA814, PA148, PA1012, PA11, PA1014, PA1212, and PA12.

10. The polyamide composition according to claim 1, wherein the electrically conductive carbon comprises carbon nanotubes and the carbon nanotubes are multiwalled carbon nanotubes (MWCNTs).

11. The polyamide composition according to claim 10, wherein the multiwalled carbon nanotubes (MWCNTs) are amino-functionalized.

12. A process for producing the polyamide composition according to claim 1, comprising:
   reacting the oligofunctional compound c) with the electrically conductive carbon in the absence of the polyamide; and
   mixing the reaction product with the polyamide;
   wherein optional constituents may be added to the mixture during the mixing.

13. A process for producing the polyamide composition according to claim 1, comprising:
   mixing the polyamide a), electrically conductive carbon b), oligofunctional compound c) and optionally conventional auxiliaries and additives d) together in a melt.

14. A process for producing the polyamide composition according to claim 1, comprising:
   producing a masterbatch of polyamide a), electrically conductive carbon b) and the oligofunctional compound c); and
   mixing the masterbatch into a polyamide comprising end groups reactive with the oligofunctional compound c);
   wherein the polyamide comprising end groups reactive with the oligofunctional compound c) optionally comprises conventional auxiliaries and additives.

15. The process according to claim 14, wherein a content of electrically conductive carbon in the masterbatch is from 3 to 25 parts by weight.

16. An object obtained by a process comprising molding the polyamide composition according to claim 1.

17. The object according to claim 16, wherein the object is a fuel filter, a fuel line or a plug connector.

18. An instrument switch comprising a molding of the polyamide composition according to claim 1, wherein the instrument switch is located in a location selected from the group consisting of an explosion-protected room and an anti-static house.

* * * * *